Sept. 23, 1930.   L. A. PERRY   1,776,701
MOLD FOR MAKING VITREOUS CHINA ARTICLES
Filed May 21, 1928   4 Sheets-Sheet 1

INVENTOR.
Lindon A. Perry,
BY Geo. E. Ubaldo
ATTORNEYS.

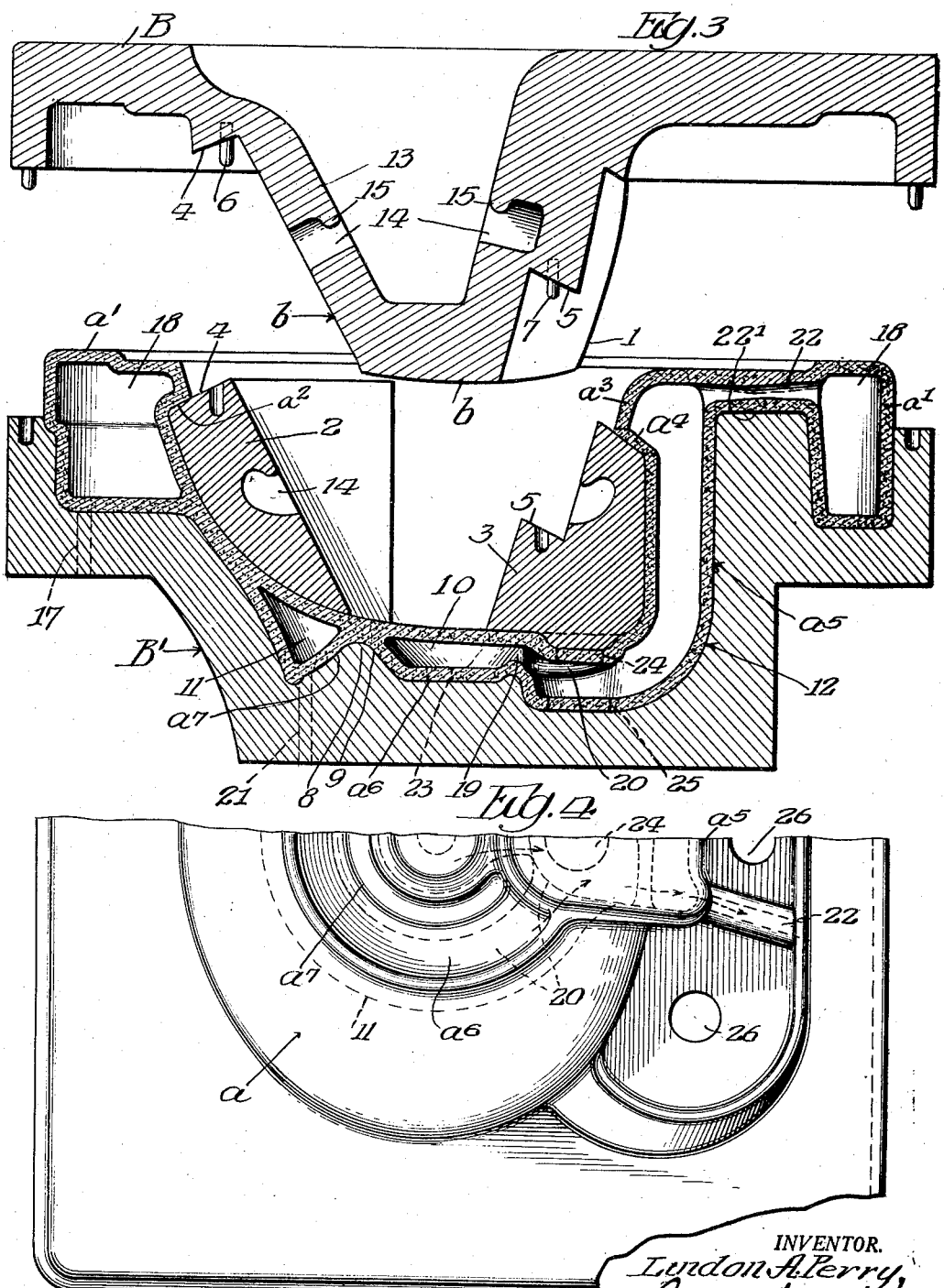

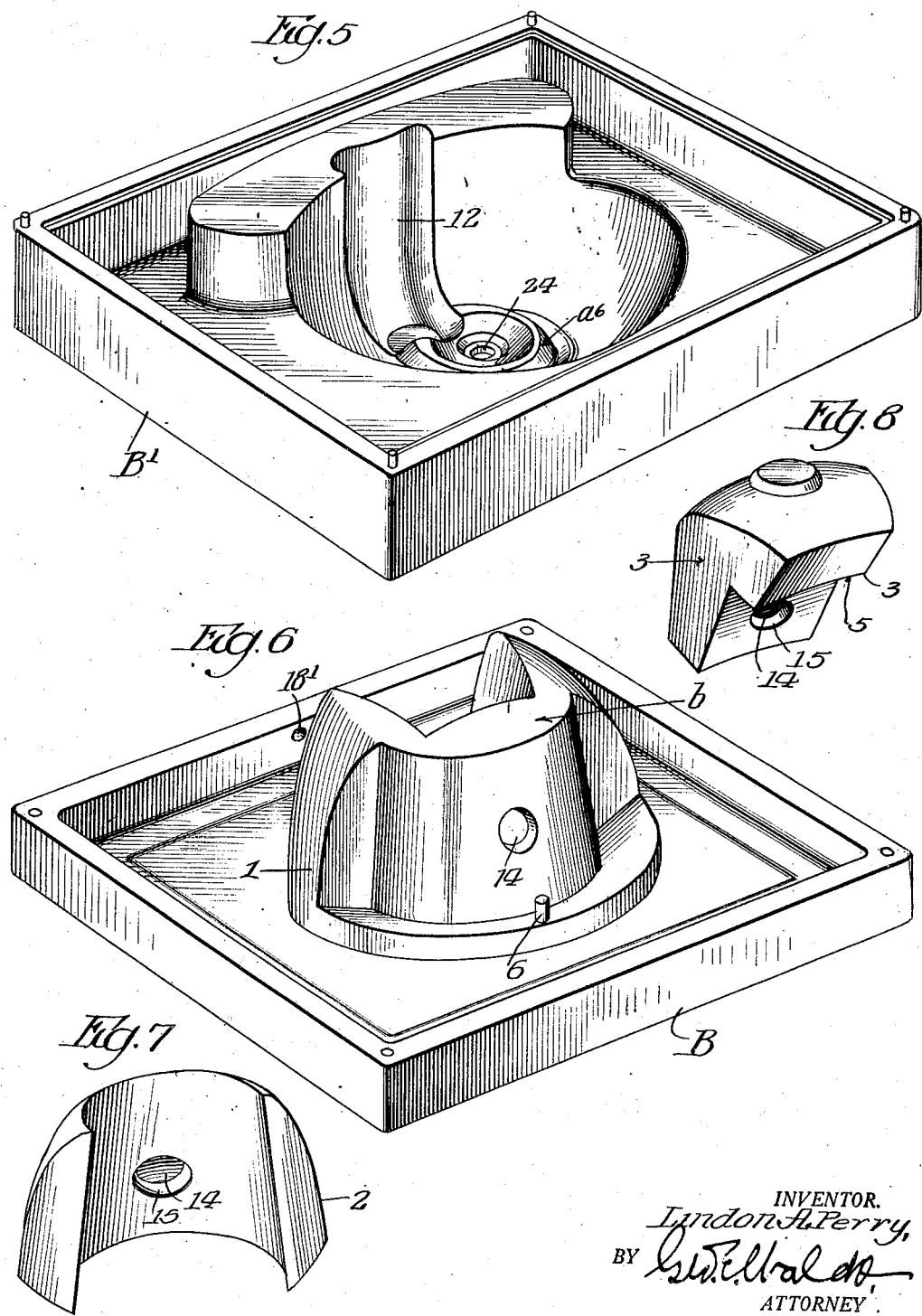

Sept. 23, 1930.   L. A. PERRY   1,776,701
MOLD FOR MAKING VITREOUS CHINA ARTICLES
Filed May 21, 1928   4 Sheets-Sheet 4
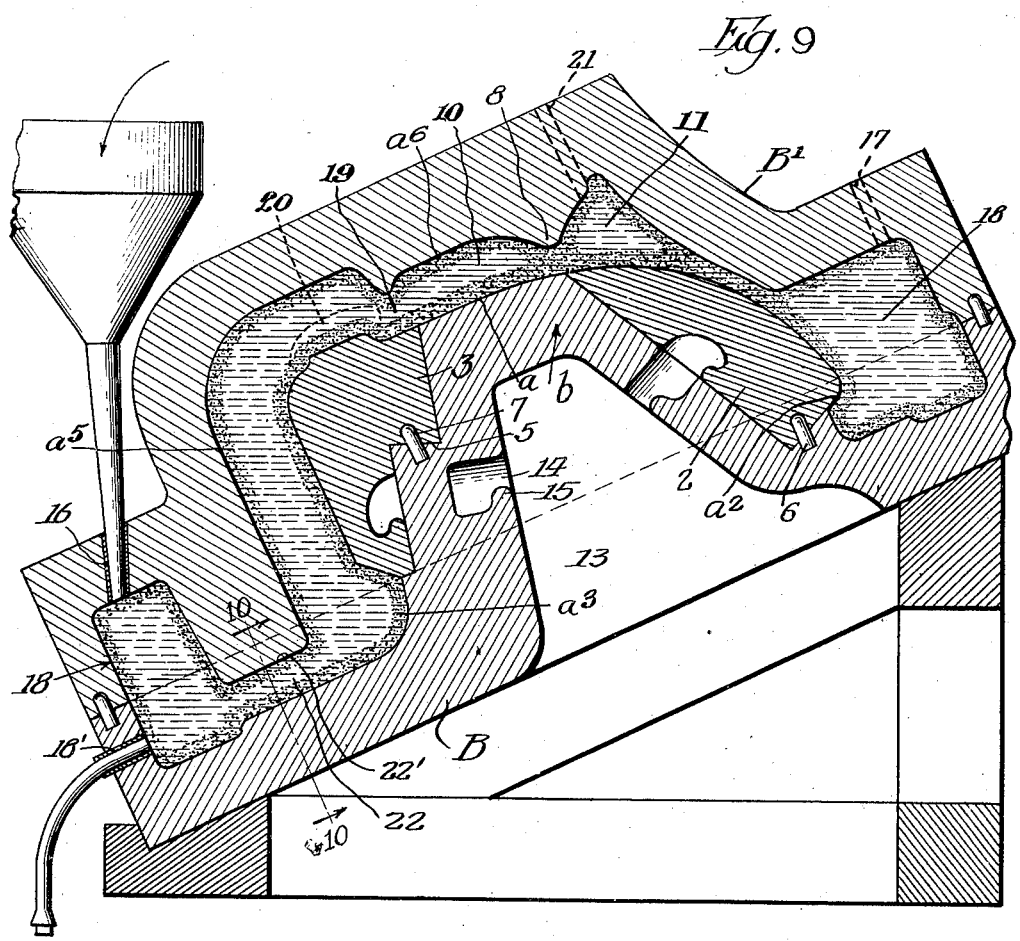
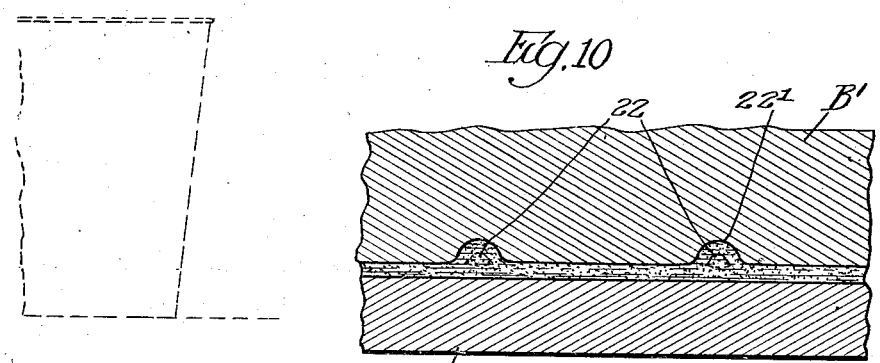
Inventor
Lindon A. Perry,
By C.W.E. Waldo, Atty.

Patented Sept. 23, 1930

1,776,701

UNITED STATES PATENT OFFICE

LINDON A. PERRY, OF WORTH, ILLINOIS, ASSIGNOR TO CHICAGO POTTERY COMPANY, OF CHICAGO, ILLINOIS, A CORPORATION OF DELAWARE

MOLD FOR MAKING VITREOUS CHINA ARTICLES

Application filed May 21, 1928. Serial No. 279,487.

This invention relates to molds for making vitreous china articles, and particularly lavatories having re-entrant ledges or surfaces which overhang the sides of the bowl proper, and other parts which in accordance with present practice, are formed separately and stuck upon the main body portion of the article.

As is generally well known, vitreous china consists of clay, flint and feldspar, the flint and feldspar being reduced to the form of an impalpable powder and thoroughly mixed with the clay and water to form what is known as "slip", which is poured into molds made of suitable absorbent material, usually plaster of Paris, which consist of separate sections adapted to be secured together, formed in or upon the adjacent sides or surfaces of which are complementary recesses and projecting portions which define a closed cavity, the walls of which conform reversely to the exterior shape or configuration of the article to be formed therein, defined by said mold sections, respectively.

In molding articles of vitreous china, slip is poured into the molds until they are full—funnels usually being used for this purpose—the affinity of the water for the plaster of Paris or other absorbent material of which the molds are made, causing the mold to absorb the liquid content of the slip and thereby to deposit the pulverulent material held in suspension therein on the walls of the mold cavity in the form of a continuous layer of substantially uniform thickness throughout. As long as the mold is maintained full of slip, this absorption and deposit process will continue, and to provide for the formation or building up of walls of desired thickness, the funnels used for supplying slip to the molds, are maintained full of slip during a predetermined period of time, which experience has shown to be necessary to produce a deposit of desired thickness. Usually slip is poured into the funnels at intervals to keep the level of the slip therein somewhat above the level of the highest point of the mold cavity. In the case of vitreous china lavatories, walls of desired thickness will be deposited in about two and a half hours, whereupon excess slip contained in the mold is drained off through suitable drain openings provided for the purpose, and the mold permitted to stand until the vitreous china has set—say for about two hours—after which the mold is removed from the article, which is then permitted to season until in condition for firing.

Due to difficulties in casting vitreous china articles arising from the plastic character of vitreous china when first molded, thus rendering it very liable to distortion under even slight pressure, and also due to the fact that vitreous china is cast in permanent molds which are used over and over—many vitreous china articles are made in several pieces, comprising a main body portion and smaller parts which are molded separately, the smaller parts being stuck onto the main portion in proper position while still soft and plastic so that they will cohere to form an integral structure. Such separately molded parts are known to the trade as "stick ons".

For example, in molding vitreous china lavatories comprising in addition to the bowl proper, a splash-rim, an over-flow housing, a hood for the overflow from the bowl, and a toque to which the supporting pedestal, if any, is adapted to be attached, all of the separate parts specified, are formed in separate molds, so that the formation of the completed lavatory, exclusive of the supporting pedestal—comprises five separate molding operations, thus greatly increasing the length of time required for making said lavatory and correspondingly increasing the work to be done and the cost of the product. Also, said separate parts are stuck onto the body portion of the bowl in proper positions while all thereof are still in a plastic condition and easily distorted in handling, the applying of said stick-ons not only involving considerable additional expert labor, but the handling thereof increasing the liability of loss by distortion.

The present manner of making lavatories—or other vitreous china articles—in which parts thereof consist of stick ons—is further objectionable for the reason that, through poor workmanship, or because of conditions under which the work is done, imperfect joints may be formed between said stick-ons and the main portion of the lavatory, the defects in which cannot be detected at the time, but which develop into cracks when the article is fired, producing what is known as dunting, which renders the article unmerchantable and practically a total loss.

The object of the present invention is to provide a mold whereby the completed article, including what heretofore have been made as stick-ons, will be formed as a single integral structure and in a single molding operation.

Use of my improved molds in actual practice in making lavatories shows that a skilled workman using said molds, can make approximately twice as many lavatories as he can when parts thereof are made in the form of stick ons. Also, actual use in practice has shown that the loss of lavatories in firing is much less where they are molded as single, integral structures by the use of my improved molds, than where parts thereof are formed separately and are stuck to the main portion of the lavatory.

To effect the objects of the invention, a mold embodying my invention and improvements comprises the various features, combinations of features and details of construction hereinafter described and claimed.

In the accompanying drawings, in which my invention is fully illustrated;

Figure 3 is a sectional view, substantially similar to Fig. 2, showing the main portion of the top mold section withdrawn.

Figure 4 is a fragmentary bottom plan view of a finished lavatory with the mold removed.

Figure 5 is an isometric projection of the inner side of the bottom mold section in upright position.

Figure 6 is an isometric projection of the main portion of the top mold section in inverted positions.

Figures 7 and 8 are detached isometric views of separable parts of said top mold section.

Figure 9 is a sectional view, substantially similar to Fig. 2, showing the mold in inverted position, as set up for use; and Figure 10 is a fragmentary sectional view on the line 10—10 of Fig. 9.

Figure 1:
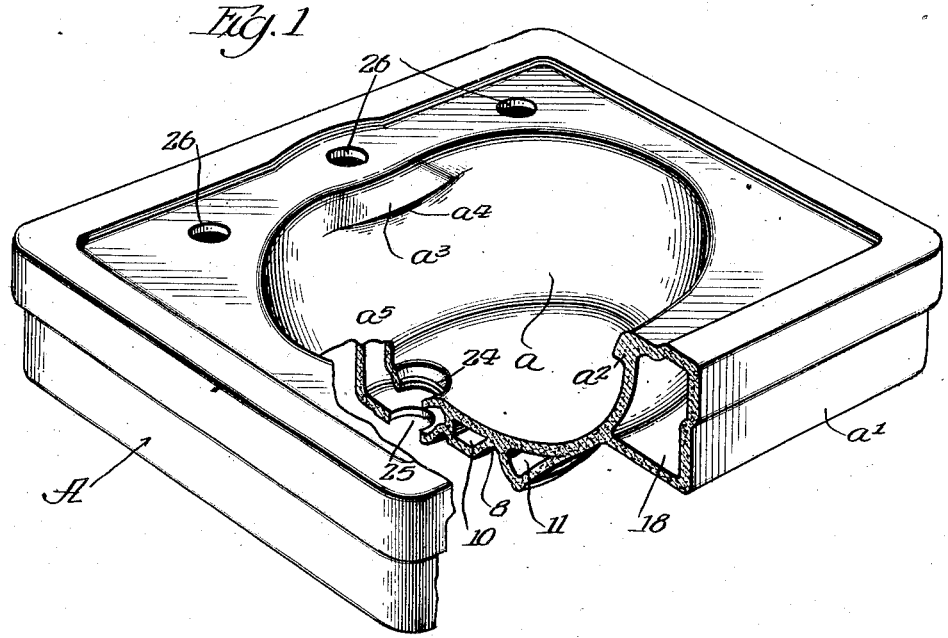
Figure 1 is an isometric projection, partly in section, of a finished vitreous china lavatory, for making which my improved mold shown, is particularly adapted.

My improved mold was particularly devised for making vitreous china lavatories by a single molding operation and as an integral structure, that is without parts made in the form of stick ons, and, for the purposes of clear and definite illustration I have, in the drawings, shown a mold adapted for making a lavatory of this particular form or type, shown separately in Fig. 1 of the drawings. Said lavatory, designated as a whole A, comprises a bowl proper $a$, a hollow rim portion $a'$, a splash rim $a^2$, a hood $a^3$ which covers the overflow opening $a^4$ an overflow housing $a^5$ and a toque $a^6$ provided with a hole adapted to receive an anchor bolt for securing the lavatory to the supporting pedestal therefor, not shown. Instead, however, of being attached to the bottom of the bowl proper $a$ at its edges only and otherwise spaced and entirely disconnected therefrom over its entire area, as heretofore, said toque $a^6$ is connected to the bottom of the wall of the bowl proper $a$ between its center and marginal edges, by an annular corrugation $a^7$, the crest of which is integrally joined to the wall of the bowl proper $a$; this being effected by properly shaping the portion of the mold which forms said toque, as presently described. By connecting the toque $a^6$ to the wall of the bowl proper, as described, said toque is strengthened to such an extent that it is rendered practicable to mold said toque integral with other parts of the lavatory.

Prior to my invention, the over-flow housing $a^5$ was made in the form of a stick on, this being necessary because its lower end was joined to the outside of the toque and had to be applied after the toque was applied. However, when a construction was devised whereby it was possible and feasible to mold the toque integral with other parts of the lavatory, it also became possible to make the over-flow housing integral with other parts of the lavatory.

To form said lavatory A as an integral structure, my improved mold comprises sections B, B' made of plaster of Paris or other suitable absorbent material, adapted to be secured together by usual means, the sides or faces of said mold sections which define the mold cavity, forming what may be called matrices, which conform reversely to the shape or configuration of the completed lavatory, in a usual manner. As regards their usual features and excepting as hereinafter particularly described and pointed out, said mold sections may be of any usual or approved construction and will be readily understood by persons skilled in the art from an examination of the drawings, without a description thereof in detail.

The mold section B comprises a projecting portion designated as a whole $b$, which defines the concave inner surface of the bowl proper $a$, including the splash rim $a^2$ and the hood $a^3$ for the overflow opening $a^4$. To effect the object of the invention, as it relates to molding said splash rim and overflow hood integral with the wall of the bowl proper, said projecting portion $b$, comprises a main part 1, and separable parts 2 and 3 adapted to be detachably applied thereto, which define said splash rim and over-flow hood, respectively.

Preferably, but not necessarily, when making vitreous china lavatories using my improved molds, said lavatories are molded up-side down, the molds being supported at an angle of about 30 degrees to the horizontal with the front side of the mold raised, as clearly shown in Fig. 9 of the drawings. With the molds in this position the separable parts 2 and 3 of the projecting portion $b$ of the mold section B may be detachably connected to the main part 1 of said projecting portion against possibility of accidental displacement, by forming interlocking shoulders on said main and separable mold parts, respectively, as shown at 4 and 5, Fig. 2, and by dowel pins 6 and 7 which project from the shoulders 4 and 5 on the main part 1 and are adapted to engage corresponding holes in the separable parts 2 and 3.

Also, to provide for removing the main part 1 of the projecting portion $b$ of the mold section B without disturbing the separable parts 2 and 3 thereof, the lines of separation and contact of the main and separable parts of said projecting portion $b$, converge towards the outer end of said main parts so as to provide necessary draft with reference to both parts 2 and 3. As shown, the engaging shoulders on the main and separable parts of said mold preferably form re-entrant angles when referred to the contacting sides or surfaces of the main and separable parts of the projecting portion $b$ of said mold section B, thus providing hooked engagement of said separable parts 1 and 2 with the main part 1 thereof. Also, the dowel pins 6 and 7 are parallel with each other and also with the line of draft in which the mold section B is withdrawn from the mold sections B'.

After the lavatory has been molded—with the mold supported in up-side-down position, as aforesaid—surplus slip is drained from the cavities of the lavatory or other article A, and the mold permitted to stand until said lavatory or other article sets, which usually requires from two and a half to three hours, after which the mold is removed so as to expose the article A molded in raw material, which is then permitted to stand until seasoned for firing. In removing the mold, it is first inverted bodily, so as to bring the mold section B on top, whereupon the mold sections are detached from each other and the mold section B is lifted off, leaving the separable parts 2 and 3 of the projecting mold portion $b$ in the bowl proper $a$.

After the main part 1 of the projecting portion $b$ of said mold section B is withdrawn, the separable mold part 2 may be withdrawn laterally into the space left vacant by withdrawal of said main part 1 without distorting the soft and pliable splash rim $a^2$. Also, the separable mold part 3 is so shaped and proportioned that, after the main part 1 of the projection portion $b$ of the mold has been withdrawn, it also may be withdrawn laterally into the space left vacant by withdrawal of the part 1, without distorting the soft and plastic overflow hood or the walls of the bowl proper $a$.

As previously stated, in order to effect the object of the invention as it relates to making the overflow housing $a^5$ integral with other portions of the lavatory, it was first necessary that the toque $a^6$ should also be made an integral part of the lavatory, instead of in the form of a stick on, as previously.

As heretofore explained, in order to make the toque $a^6$ integral with other parts of the lavatory, it was necessary to devise a construction to make said toque sufficiently strong so that it would not collapse from its own weight when the slip contained in the cavities of a lavatory being molded is drained off after the molding of the lavatory had been completed, thus leaving the very soft, plastic walls of different parts of the lavatory exposed in cavities thereof, unsupported.

Also, it was essential to devise a construction whereby the slip contained in the cavities of the lavatory could be drained off after the molding operation had been completed.

As the invention relates to making the toque $a^6$ integral with other parts of the lavatory, I attain the object of the invention by forming an annular ridge 8 at the bottom portion of the cavity in the mold section B' which defines the toque, which is substantially concentric with said toque and is positioned about midway between the center and the outer edges thereof, said ridge 8 being of such height that when the mold is assembled, the crest thereof will extend into such proximity to the corresponding side of the mold section B that the crest of the corrugation 9 formed in the toque by said annular ridge 8 will contact and merge integrally with the wall of the bowl proper $a$, thus forming a central cavity 10 and a separate outer annular cavity 11 in said toque.

Having thus provided a construction whereby it is possible to mold the toque integral with other parts of the lavatory, it was possible, also, to form the overflow housing $a^5$ as an integral part of said lavatory and in a single molding operation, by providing a recess 12 in the mold section B', properly positioned and which conforms to the size and shape of the exterior of said overflow housing; the rear wall of the bowl proper $a$, being deposited on the rear side of the projecting portion $b$ of the mold section B, and the walls of the overflow housing depositing on the sides of the recess 12 in the mold section B' with their edges integrally joined to the wall of the bowl proper $a$.

To reduce the weight of the mold section B to render it more convenient for handling, the outer side thereof is recessed in a usual manner, as shown at 13, leaving walls of only sufficient thickness to provide adequate strength. Also, to provide for conveniently handling said mold section, openings 14 are formed in the sides of said recess 13 which have finger grips 15 thus providing for conveniently grasping said mold section. As shown, also, the separable parts 2 and 3 of the projecting portion $b$ of the mold section B, are provided with substantially similar hand grips, so that they may be grasped conveniently and firmly when it is desired to withdraw them.

In accordance with common practice, the mold section B' is provided with a suitable hole or opening into which a funnel for supplying slip to the mold is adapted to be connected by means of a suitable tight joint, said funnel having a long spout, and a bushing 16 being secured in the hole to prevent wear thereof, the spout of the funnel being closely fitted to the bore of said bushing to form a tight joint. Said mold is also provided with a vent opening, indicated at 17, adapted to prevent air from being trapped in the chamber 18 of the rim portion $a'$ of the lavatory, and with drain openings 18' adapted to communicate with the chamber of the mold in which said rim section $a'$ is formed and which, during the molding operation are closed by suitable plugs, not shown, all in a usual manner.

Figure 2:
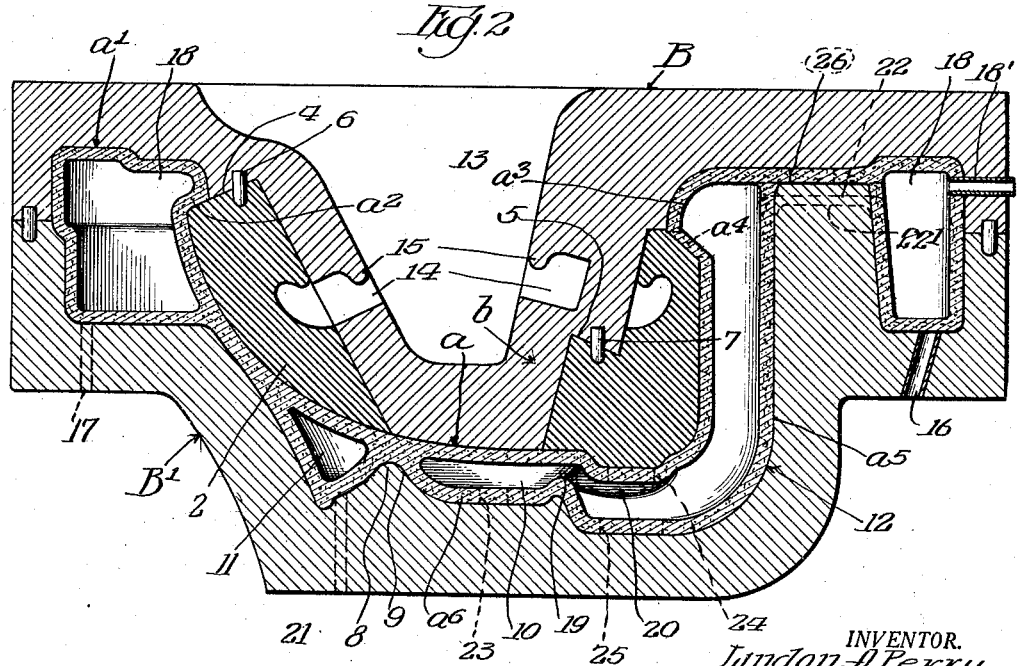
Figure 2 is a vertical, central sectional view, from front to back of a mold of my invention adapted for making vitreous china lavatories, in upright position, with a lavatory deposited therein, also shown in section.

As shown, the portions of the mold section B, B' which define the portion of the toque to which the overflow housing $a^5$ is attached, are so shaped and proportioned, that an opening 19 will be formed connecting the chamber 10 of the toque with the chamber 12 of the overflow housing. Also, the opposed walls of the mold sections B, B' which define the portion of the toque in which the chamber 11 is formed are so shaped and proportioned that openings 20, Figs. 2 and 9, are formed connecting said chamber 11 with the chamber 12 of the overflow housing at both sides thereof, the relation being such that, as the mold is set up for use, see Fig. 9, all parts of the chamber 11 will be higher than the lower side of said drain openings 20, thus permitting liquid slip to drain from said chamber 11 into the interior of the overflow housing.

To prevent air from being trapped in the portion of the mold cavity which defines the toque and overflow housing, a vent opening indicated at 21 is provided and to provide for draining the liquid slip from the chambers 10, 11 and 12, a drain opening or openings 22, see Figs. 9 and 10, are provided in the wall of the mold, through which slip drains from said chambers into the rim chamber 18, from which it is discharged through the drain opening or openings 18' into a suitable receptacle. As the slip deposits in a layer of substantially uniform thickness on all walls of the mold, the drainage openings or passageways 22 may be formed by making grooves or channels 22' in the surface of the mold, the positions of which will correspond with the positions of said drainage openings, thus increasing the distance between opposed walls of the mold, so that, when a normal thickness of slip has been deposited, passageways 22 will remain connecting the chamber of the overflow housing with the rim chamber 18, in the manner desired.

The lavatory having been molded, the mold removed, and the vitreous china permitted to set, the overflow opening $a^4$ and certain other openings for making fitting attachments to the lavatory, indicated in dotted lines at 23, 24, 25 and 26, are punched in the walls of the lavatory while it is still relatively plastic, in a usual manner.

After the lavatory has set and the openings, including the opening 26 are punched therein, and before the lavatory is fired, the drain opening 19 which connects the toque chamber 10 with the chamber 12 of the overflow housing $a^5$ is closed by means of clay plugs inserted therein—which may conveniently be done through the opening 25—thus preventing waste water from running into the chamber 10 from the overflow housing, through the opening 24 into the supporting standard for said lavatory, if any, and down said standard onto the floor.

I claim:

1. A mold for making vitreous china lavatories comprising a bowl, a toque, and an overflow housing, all formed as an integral structure, said mold consisting of complementary sections, the portion of the mold which defines the toque of the lavatory comprising a raised portion intermediate the marginal edges and the center of the toque-forming portion of the mold which is so proportioned that when the mold is assembled, the crest of said raised portion will extend into such proximity to the opposed surface of the mold section which defines the recess in the bowl of the lavatory that the toque of the finished lavatory will be connected to the wall of the bowl of the lavatory intermediate the marginal edges and center of the toque, forming separate inner and outer chambers therein, and the mold also being provided with a recess positioned, shaped, and proportioned to form the overflow housing, said mold also being provided with channels proportioned to form drainage passages in the finished lavatory adapted to permit slip to drain from the chambers of the toque and overflow housing of the lavatory.

2. A mold as specified in claim 1, in which the channels in the mold for forming the drainage passages in the finished lavatory comprise channels which connect the chambers of the toque-forming portions of the mold cavity with the mold cavity for forming the overflow housing and the cavity for forming said overflow housing with the mold cavity for forming the hollow rim portion of the lavatory.

3. A mold as specified in claim 1, in which the mold also comprises a mold section comprising a projecting portion which defines the recessed interior of the lavatory bowl, said projecting portion of said mold section comprising a main part unitary with said mold section and a separable part which defines a hood for the overflow opening of the bowl and which forms a re-entrant ledge on the inner surface thereof, said main and separable parts of said mold section having contacting surfaces shaped to provide draft to permit withdrawal of the main part of said projecting portion with the mold section to which it is attached without disturbing the separable hood-forming part thereof and also comprising surfaces which extend transversely to the line of draft, said transverse surface of the main part of the projecting portion of said mold section forming a ledge on which the opposed surface of said separable part will rest when the mold is in inverted position, providing means for supporting said separable part in position on said main part, said separable part being shaped to permit its withdrawal laterally into the space left vacant by the withdrawal of said main part of said mold projection without disturbing the plastic wall of the lavatory or said hood.

4. A mold as specified in claim 1, in which the mold also comprises a mold section comprising a projecting portion which defines the recessed interior of the lavatory bowl, said projecting portion of said mold section comprising a main part unitary with said mold section and a separable part which defines a hood for the overflow opening of the bowl and which forms a re-entrant ledge on the inner surface thereof, said main and separable parts of said mold section having contacting surfaces shaped to provide draft to permit withdrawal of the main part of said projecting portion with the mold section to which it is attached without disturbing the separable hood-forming part thereof and also comprising surfaces which extend transversely to the line of draft, said transverse surface of the main part of the projecting portion of said mold section forming a ledge on which the opposed surface of said separable part will rest when the mold is in inverted position, providing means for supporting said separable part in position on said main part, said separable part being shaped to permit its withdrawal laterally into the space left vacant by the withdrawal of said main part of said mold projection without disturbing the plastic wall of the lavatory or said hood, said mold section also comprising means for securing the separable parts of said projection in position on the ledge of the main part thereof.

5. A mold of absorbent material adapted for making vitreous china articles having a recess in a side thereof, formed on the inner surface of which is a re-entrant surface, said mold consisting of top and bottom sections, the inner surface of the top section thereof conforming reversely to the configuration of the recessed side of the finished article which is exposed when said top mold section is removed, said top mold section comprising a projecting portion which defines the recess in the article and the re-entrant ledge thereof, said projection comprising a main part unitary with said top mold section and a separable part which defines said re-entrant surface, said main and separable parts of said top mold section having contacting surfaces shaped to provide draft to permit withdrawal of the main part of said projecting portion with the mold section with which it is unitary without disturbing the separable part thereof, said main and separable parts of said projection also comprising surfaces which extend transversely to the line of draft, the transverse surface of the main part of said projecting portion forming a ledge on which the opposed transverse surface of said separable part will rest when the mold is in inverted position, providing means for supporting said separable part in position on said main part to form therewith the wall of the mold cavity defined by the projecting portion of said top mold section.

6. A mold of absorbent material for making recessed vitreous china articles as specified in claim 5, which also comprises means for detachably securing the separable part of the projecting portion of said mold section in position on the transverse supporting surface of the main part of said mold section.

7. A mold as specified in claim 5, in which the projecting portion of the top mold section comprises a plurality of separable parts, each of which defines a re-entrant surface on the inner wall of the finished article.

In witness that I claim the foregoing as my invention I affix my signature this 2nd day of May, A. D. 1928.

LINDON A. PERRY.